No. 661,671. Patented Nov. 13, 1900.
G. H. F. SCHRADER.
TIRE OR OTHER VALVE.
(Application filed Apr. 7, 1897.)
(No Model.)

WITNESSES:
Fred White
René Bruine
INVENTOR:
George H. F. Schrader,
By his Attorneys,
Arthur C. Fraser & Co.

UNITED STATES PATENT OFFICE.

GEORGE H. F. SCHRADER, OF NEW YORK, N. Y.

TIRE OR OTHER VALVE.

SPECIFICATION forming part of Letters Patent No. 661,671, dated November 13, 1900.

Application filed April 7, 1897. Serial No. 631,082. (No model.)

*To all whom it may concern:*

Be it known that I, GEORGE H. F. SCHRADER, a citizen of the United States, residing in the city, county, and State of New York, have invented certain new and useful Improvements in Tire or other Valves, of which the following is a specification.

This invention relates to valves, and especially to pneumatic valves—such, for example, as tire-valves—and aims to provide certain improvements especially applicable to valves of the latter class.

Tire-valves are constructed both as shoe-valves, which are clamped to a tire by means of a nut screwing on the exterior of the shell and compressing the tire against a flange on the end of the shell, or as cot-valves, in which the shell is fastened in a tubular cot projecting from the tire. With either construction it is important to have easy access to the working parts of the valve and to be able to remove these parts without disconnecting the shell from the tire or other part to which it is fastened. It is also important to provide durable means for effecting a tight joint beyond the valve-seat, so that a perfect closure can be made after assembling the parts of the valve irrespective of the number of times these parts are removed. The extremely small diameter of the valve has rendered this difficult of accomplishment.

My invention aims to provide improvements whereby a tight joint at the outer end of the valve-chamber can be obtained with each assembling of the parts of the valve and whereby the life and effectiveness of the joint will not be impaired by excessive force in assembling the parts or by frequent removal thereof.

The invention also aims to provide certain features of improvement in the construction of the parts of the valve.

To this end in carrying out the preferred form of my invention as applied to a tire-valve I provide a valve-shell having a separable seat member, reciprocal faces for making a leak-tight joint between said parts, a screw-threaded plug for uniting said parts, and a swivel connection between the plug and the faces, avoiding the necessity of relative rotation of the latter with the screwing in and out of the plug, and I provide certain other features of improvement, all of which will be hereinafter more fully set forth.

Figure 1:
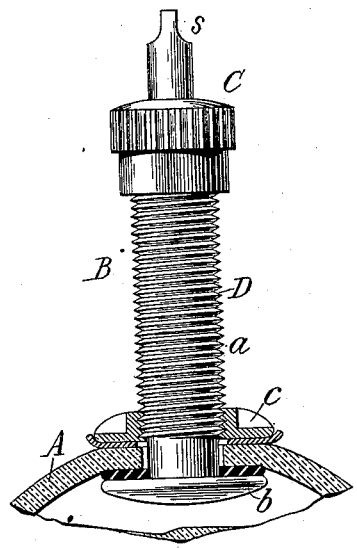
Figure 2:
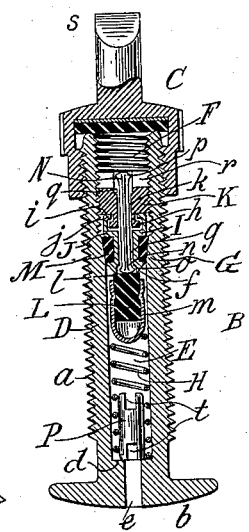
Figure 3:
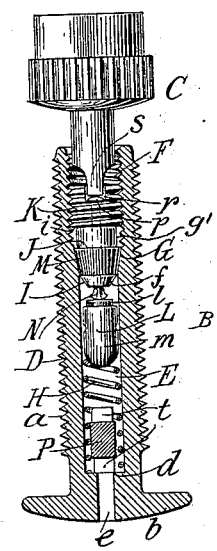
Figure 5:
Figure 4:
Figure 6:
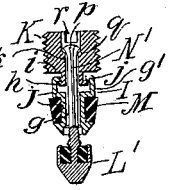

In the accompanying drawings, which illustrate certain adaptations of my invention as applied to pneumatic valves, Figure 1 is a side elevation of a shoe-valve clamped to a tire, the latter being shown fragmentarily in section. Fig. 2 is an axial section of the valve, showing its working parts in the closed position. Fig. 3 is a similar view showing its working parts in the open position. Fig. 4 is a side elevation of the seat member and its plug. Fig. 5 is a sectional view of these parts, the packing-ring and the valve proper separated; and Fig. 6 is a sectional view of these parts, showing a modification in which the valve is a rigid-stem valve.

I will now describe in detail the preferred form of my improvements.

Referring to the drawings, let A represent a single-tube pneumatic tire, B a valve fastened thereto, and C the cap for this valve. These parts may be of any usual or suitable construction, the valve shown consisting of a combined shell and tire-tube D, having an external screw-thread $a$ and a flange $b$ within the tire, a nut $c$ screwing on the thread to clamp the tire between itself and the flange. The thread $a$ extends to the other end of the shell and carries the cap C. Internally the shell has a valve-chamber E, terminating at its lower end in a shoulder $d$, from which an egress-duct $e$ leads to the tire. At its other end the shell has a threaded socket F, between which and the valve-chamber the shell is formed with a suitable portion, as the face G, for making a leak-tight joint with the seat member I, which latter carries a reciprocal face or portion J opposite this wall when the seat member is in position. A plug K, having an external screw-thread fitting and engaging the thread of the socket F, holds the seat member in place. A valve proper, L, is mounted within the chamber. A spring H may be placed below the valve proper for forcing it toward the seat.

According to the main feature of my present invention the seat member and the plug are separate parts independently rotatable and preferably also more or less relatively movable axially, so that the one need not participate in all the movements of the other.

As shown, they may be connected together in some suitable manner. Preferably I provide a connection whereby the rotation of the plug K need not be transmitted to the parts carrying the engaging seating-faces, and I preferably make the seat member itself non-rotative and couple it to the plug by an inseparable swivel connection, so that it is forced in and drawn out therewith, but need not rotate. I prefer to employ a packing for preventing leakage past the seat member, which packing may engage any suitable parts of the shell and seat member. As shown, I prefer to interpose a ring of rubber or other packing material M between the faces of the shell and seat member for assuring a tight joint. This may be variously provided for, either part being a suitable carrier therefor; but I prefer to construct the bearing portion J of the seat member as an annular groove and to spring the ring M into this groove immediately back of the annular tapering seat $f$. The ring M is preferably conical or tapering in form from its lower end upwardly, and the opposing face G of the shell is preferably also tapering and of smallest diameter where it meets the cylindrical walls of the valve-chamber. The latter is of relatively small diameter, while the socket F is of relatively large diameter in the construction shown, the wall G leading from the one to the other. Thus the packing is connected to the plug by the seat member and is compressed by screwing in the plug, so that it is forced tightly against the shell and seat member; but it is still free from the necessity of revolving with the plug. The member I, as shown, has an enlarged upper end $g'$ above the packing-ring M, on which end by preference the plug K rotatively bears. Internally the member I has an ingress-duct $g$ traversing it and opening at the middle of the valve-seat $f$.

The plug K and member I are preferably swiveled or rotatively connected together by engaging or overhanging provisions, which may be formed integrally with or on the parts themselves, if desired, as by constructing the plug with a projecting shoulder $h$ immediately below its bottom face $i$, over which shoulder an inturned flange $j$ on the member passes, the engagement being sufficient to fasten the parts together against separation, but permitting looseness enough for free rotation of the plug and for independent seating of the member. The plug and member are both preferably tubular and distinct, the duct $k$ through the plug serving as a continuation of the duct $g$ through the member.

The valve proper may be of any suitable construction. That shown consists of an imperforate rubber plug $l$, carried by a cup-shaped metal casing $m$. The stem is in this instance a separate part movable independently of the valve proper and consists of what is known as a "deflater" N, which passes through both the member and plug and is inseparably connected, preferably, to both by any suitable engaging, opposing, or overhanging provisions—as, for example, by having an enlarged lower end $n$ engaging a shoulder $o$ on the member and an enlarged upper end $p$ engaging a shoulder $q$ on the plug. The head $p$ projects, preferably, into the notch $r$ of the plug, so that it can be engaged by the finger $s$ of the cap and forced in to unseat the valve for deflating purposes, as shown in Fig. 3. The seat member and the plug are each rotative independently of the stem, as well as of each other; but both are prevented by the enlargements of the stem from disconnection from it or from each other in any case, whether or not they are otherwise connected together, and if so connected and such connection should break the enlargements will prove a desirable auxiliary swivel connection for still preventing separation of the parts from each other and of either of them from the stem, while still permitting their rotation relatively to it and to each other.

To limit the inward movement of the valve proper and to guide the spring H when used, I prefer to provide a stop P, which preferably consists of a freely-movable unconnected cylindrical block fitting within the spring beneath the valve proper, resting on the shoulder $d$, and having grooved or slotted portions $t$ for permitting passage of air.

In operation screwing in the plug will both compress the packing and hold in the seat member when both are used, and in the construction shown the forcing in of the seat member by inward screwing of the plug will compress the packing between or against the walls of this member and the shell without any twisting or rotative tendency, so that the packing can be forced up to make a tight joint without distortion or impairment. Unscrewing the plug will draw the seat member out without rotating it, so that simply the adhesion, if any, between the packing-ring and the wall G will have to be overcome. Should the plug be forced in too far, the packing-ring will yield under compression and the seat member will move in until its large part $g$ strikes the wall G and prevents further inward movement. When released, the packing-ring will resume its normal shape uninjured. The valve proper will operate as ordinarily. To repair or renew any of the parts, the plug will be quickly unscrewed, whereupon all the parts can be withdrawn or dropped out. The connection between the seat member and the stem will prevent its loss, while the freedom between the stem N and the valve proper, L, will permit the substitution of a new valve proper without requiring separation of the stem.

It will be seen that my invention provides improvements whereby all the parts of the valve can be repaired without disconnecting the shell from the article to which it is fastened and that a tight joint around the valve-chamber is assured, while the life of the packing at this joint is greatly prolonged, and it will be understood that the invention is not limited to the particular details of construction, arrangement, connection, or combination of the parts nor to the particular character of valve set forth and shown as constituting the preferred form of the invention, since it can be availed of according to such modifications or with such forms of valve as circumstances or the judgment of those skilled in the art may dictate without departing from the spirit of the invention.

In the construction shown in Fig. 6 a rigid stem-valve proper, L', is shown, the stem N' of which is fixed in the plug K and seat member I for the same purposes and in the same manner as before described for the separate stem N. The seat member I and the other parts are here identical with those before described and bear the same letters of reference.

By the term "swiveled" as used in the specification and claims of this application I mean and include any connection, either direct or indirect, between two or more parts capable of permitting rotation of the one relatively to the other or others.

What I claim is—

1. In tire and other valves, a shell member having a valve-chamber and an outer screw-threaded socket, in combination with a plug screwing into said socket, a valve-seat held therein by said plug, a packing surrounding said seat and compressed against said shell by the screwing in of said plug for making a leak-tight joint between said seat and the walls of said chamber, and means between said plug and packing transmitting the inward pressure of the plug thereto without rotating the packing with the plug, and a valve proper in said chamber engaging said seat.

2. In tire and other valves, a shell having a valve-chamber and a screw-threaded socket, in combination with a plug screwing into said socket and carrying a valve-seat, a packing-ring compressed by the screwing in of said plug for making a leak-tight joint between said seat and the walls of said chamber, and means between said plug and packing-ring permitting rotation of the plug independently of the ring, and a valve proper in said chamber.

3. In tire and other valves, a shell having a valve-chamber and a screw-threaded socket, in combination with a tubular member within said shell having a valve-seat, a valve proper in said chamber engaging said seat, a packing material between said shell and member, and a plug movable independently of said member screwing in said socket for holding the member therein.

4. In tire and other valves, a shell having a valve-chamber and a screw-threaded socket, in combination with a removable tubular seat member within said shell, and an independently-rotative plug screwing in said socket and holding said seat member therein, and a packing compressed against said shell and member for making a leak-tight joint, and a valve proper in said chamber.

5. In tire and other valves, a shell having a valve-chamber and a screw-threaded socket, in combination with a tubular seat member within said shell, one of said parts having an annular groove, and the other a face opposite said groove, a ring of packing material in said groove, and a screw-threaded plug distinct from said seat member screwing on said shell and compressing said ring between said member and shell.

6. In tire and other valves, a shell having a valve-chamber, and a valve proper therein, in combination with a tubular plug and a tubular seat member swiveled together and fastened in said shell, and a stem for said valve proper traversing said plug and member.

7. For tire and other valves, the improved seat member consisting of a tubular part having an annular valve-seat at one end for entering the chamber of a valve-shell, having an annular wall beyond said seat for making a leak-tight joint with such shell, and having an independently-rotative screw-threaded plug connected to it for engaging such shell.

8. The improved article of manufacture comprising a seat member for entering the chamber of a valve-shell, having an annular valve-seat at one end, and a tubular plug rotative relatively to said member at its other end for coupling it to a valve-shell, and a valve-stem traversing said members and movably and irremovably connected thereto.

9. As a new article of manufacture a tubular plug having a screw-thread for fastening it to a valve-shell, a valve-seat carried by said plug for entering a valve-chamber, and a ring of packing material rotatively connected to said plug for making a tight joint around said seat.

10. In tire and other valves, a valve-shell having a valve-chamber, a seat and a valve proper, in combination with a stop P consisting of a freely-movable part within said chamber at the egress side of said valve proper.

11. In tire and other valves, a valve having a valve-chamber, a seat, a valve proper, and a spring for the latter, in combination with a freely-movable part P within said spring.

12. In tire and other valves, a shell having a valve-chamber and a screw-threaded socket, in combination with a tubular seat member entering said socket and having a valve-seat, a packing-washer making a leak-tight joint between said shell and seat member, a separate plug screwing into said socket, holding said seat member and washer in said shell, and rotative independently of said parts, and a valve proper in said chamber and engaging said seat.

13. In tire and other valves, a shell having a valve-chamber and a screw-threaded socket, and a valve proper in said chamber, in combination with a seat removably held in said shell, and a separate plug screwing into said socket and holding said seat in said chamber, and means withdrawing said seat with the unscrewing of said plug therein.

14. In tire and other valves, a shell having a valve-chamber and a screw-threaded socket, and a valve proper in said chamber, in combination with a seat member in said shell, a separate plug screwing into said socket and holding said member therein, and a packing compressed by the screwing in of said plug and means withdrawing said seat member with the unscrewing of said plug.

15. In tire and other valves, a shell having a valve-chamber and a screw-threaded socket, and a valve proper in said chamber, in combination with a seat member in said shell, a plug screwing into said socket and holding said member therein, and a stem traversing said parts.

16. In tire and other valves, a shell having a valve-chamber and a screw-threaded socket, and a valve proper in said chamber, in combination with a tubular seat removably held in said shell, a separate tubular plug screwing into said socket, and holding said seat in said chamber, and a stem traversing the apertures through said plug and seat, and having near its extremities portions of greater size than such apertures, whereby the stem is connected to said parts.

In witness whereof I have hereunto signed my name in the presence of two subscribing witnesses.

GEO. H. F. SCHRADER.

Witnesses:
GEORGE H. FRASER,
FRED WHITE.